Dec. 5, 1950 W. H. ROWAND 2,532,332
SEPARATOR
Filed May 31, 1946 2 Sheets-Sheet 1

INVENTOR
Will H. Rowand
BY
R. H. Holbrook
ATTORNEY

Patented Dec. 5, 1950

2,532,332

UNITED STATES PATENT OFFICE 2,532,332

SEPARATOR

Will H. Rowand, Madison, N. J., assignor to The Babcock & Wilcox Company, Rockleigh, N. J., a corporation of New Jersey Application May 31, 1946, Serial No. 673,290

5 Claims. (Cl. 183—75)

My invention relates to the separation of material from a fluid stream.

My invention more particularly resides in the effecting of the separation of material of higher density from a fluid stream by creating within that stream, or between divisions of that stream, a separation zone, or zones, of reduced pressure.

More specifically, my invention involves the separation of material from a fluid stream by utilizing the downstream vortex zone produced by the trailing edge of an airfoil type of section when located at a certain angle of attack to the fluid stream. For steam and water separation, I have found that the maximum separation takes place when the angle of attack is 22½°. By the expression "angle of attack," I refer to the angle between the plane of the airfoil and the direction of fluid velocity in the approaching stream. At greater angles, the resistance to flow increases and the separation effectiveness of the zone of reduced pressure decreases. As the angle of attack is decreased from 22½°, the separation capacity decreases, and the extent of the zone of reduced pressure also decreases.

My invention is particularly adapted for use in connection with the generation of steam, and is effective for the removal of moisture and other impurities from steam discharged from the steam and water drum of a steam generator.

The importance, in steam generation, of providing clean dry steam has long been recognized, but as the operating pressures and operating capacities of steam generators have increased, it has been realized that the need for removal of moisture and other impurities from the steam to a greater degree, has become more and more important. This is particularly true where the circulating water of a steam generator contains a high concentration of solids for the purpose of preventing internal corrosion of the pressure parts. If particles of such solids are carried by the steam passing from the generator, there would be increased outage and increased maintenance costs by reason of the deposition of the solids in the superheater or on the turbine blades.

Some prior art devices proposed for steam and water separation in a steam boiler drum have been based upon the inertia principle of fluid separation, and have involved a series of baffles arranged to receive the impact of the steam and water mixture entering the drum. Separators of this type have been found ineffective particularly at high boiler loads as the moisture in the mixture striking the separator baffles at high velocity is caused to be so dispersed that a substantial portion of the divided particles is again picked up by the stream, and this action is repeated in subsequent baffle contacts. Such separators have also involved undesirably high pressure drops.

Other steam and water separators used in boiler steam drums have involved apparatus presenting surfaces closely arranged adjacent streams of fluid, with moisture particles separating from the streams by adhesion to those surfaces.

In contrast, the apparatus embodying my invention is so arranged that, in normal operation, there are set up eddy currents or vortices in predetermined positions to provide well defined zones of lower pressure in which moisture particles may gather and accumulate to such sufficient mass size that separation by gravity from the flowing vapor may be effected.

My invention involves such division and deflection of a steam and water mixture that a large number of lower pressure eddy current zones are distributed throughout the mixture, these zones constantly receiving particles of water from the flowing mixture. Such particles collect in these zones, and are subject to constant removal therefrom, as by gravity. Furthermore, the deflection of the parts of the mixture stream is minimized in order that the separation of the high gravity particles may be effective with a minimum flow resistance.

Another object of the invention is the provision of a separator characterized by the use of a plurality of separator elements of the airfoil type set at such an angle of attack that there is an optimum ratio of total separation in the eddy current zones to pressure drop. A further and more specific object is the provision of a steam and water drum separator capable of producing clean and dry steam at high boiler loads and varying drum water levels.

The invention will be described with reference to the accompanying drawings, and other objects of the invention will appear as the description proceeds.

Figure 5:
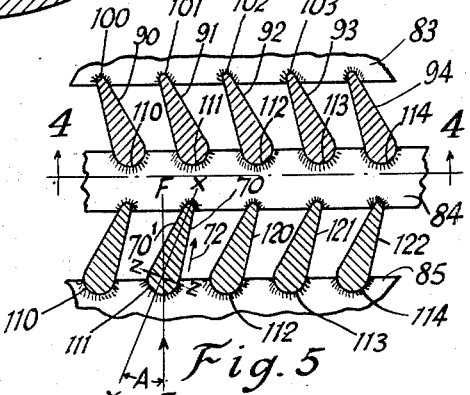
Figure 4:
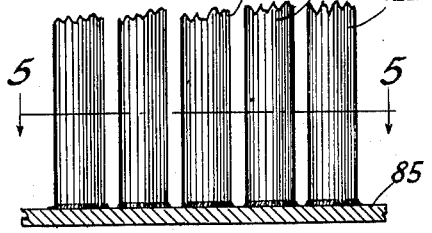
Fig. 4 is a partial vertical section on the line
Figure 6:
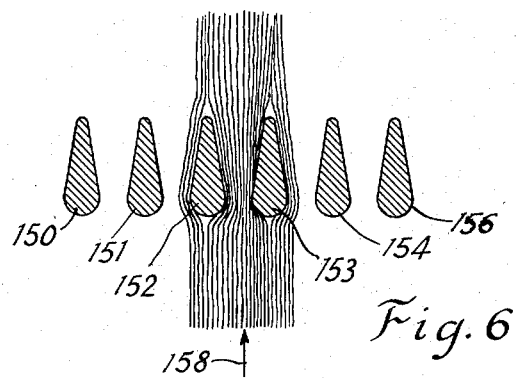
Figure 7:
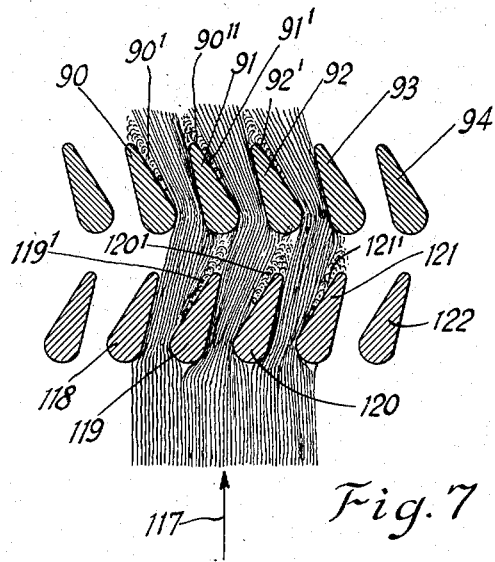

4—4 of Fig. 5, showing parts of the separator elements in front elevation;

Fig. 5 is a horizontal section on the line 5—5 of Fig. 4;

Fig. 6 is a diagrammatic view illustrating the fluid flow when the separator elements are set with their major transverse axes parallel to the general direction of flow of the fluid stream; and Fig. 7 is a diagrammatic view similar to Fig. 5, but illustrating the fluid flow when the separator elements are set at the preferred angle of 22½° to the general direction of flow of the approaching fluid stream.

Figure 1:
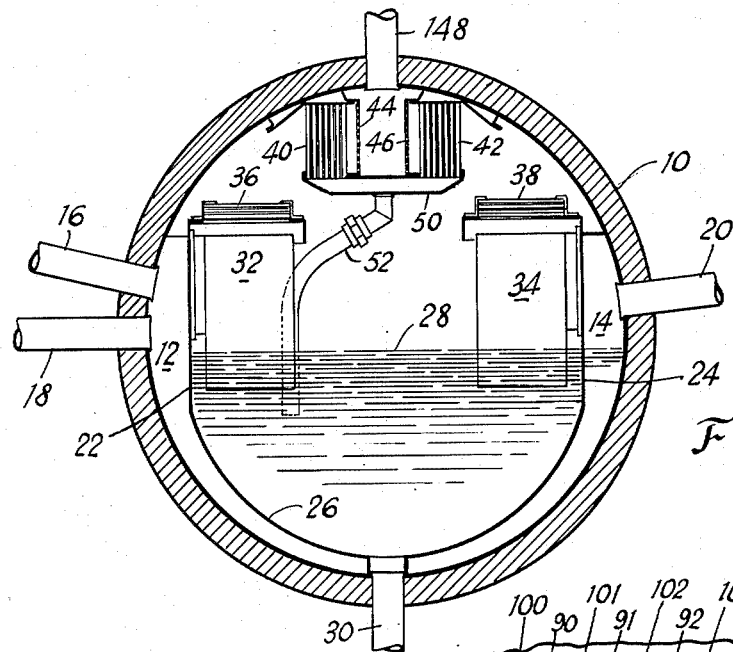
Fig. 1 is a fragmentary transverse section of a steam and water drum in which the invention is employed.

In the drawings, Fig. 1 indicates a steam and water drum 10 of a water tube steam boiler. Steam and water mixtures from steam generating tubes are discharged into the drum inlet chambers 12 and 14 through the circulators 16, 18, and 20. The inlet chambers are provided by the fixed upright walls such as 22 and 24 and their connecting walls such as the end walls and a curved bottom wall 26.

The water level of the steam generator is indicated at 28, and circulation to the lower parts of the steam generating tubes is provided through downcomers such as 30 communicating with the water space of the drum.

Secured to the upright walls 22 and 24 are a plurality of whirl chamber steam and water separators such as 32 and 34. These separators are preferably of the type illustrated in the Rowand and Fletcher Patent 2,289,970. Each has a tangential inlet in communication with the drum inlet chamber so that the centrifugal steam and water separating action may take place therein. The separated steam flows through auxiliary separators such as 36 and 38 and then through the separators 40 and 42 which embody the present invention.

From the separators 40, 42, the steam flows through the upright perforated plates 44 and 46 and to a steam offtake 48. Separated water is returned from the pan 50 by a return pipe 52, the outlet of which is disposed below the drum water level as indicated in Fig. 1.

Figure 3:
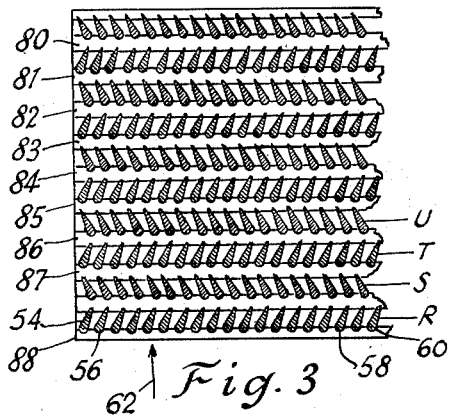
Fig. 3 is a horizontal section of the separator on the line 3—3 of Fig. 2.

Figs. 2, 3, 4, and 5 of the drawings indicate the structure of the illustrative separator (one of the separators 40 and 42). The separator consists of a plurality of rows, R, S, T, and U etc., of spaced upright elements (such as 54, 56, 58, and 60) of airfoil type sections with their major transverse axes set at an angle of 22½° to the general direction of steam flow. In Fig. 3, the steam flow is indicated by the arrow 62 and in Fig. 5 by the line FF and the associated arrow. In the latter Figure, XX indicates the direction of the major transverse axes of the airfoil element 70.

Where a row of separator elements of elongated cross-section such as 54 are arranged across a fluid stream path with their major transverse axes in alignment with (or parallel to) the direction of fluid approach, streamline flow takes place across the entire transverse free flow area between the elements, and the boundary layers do not break away from the stream flowing between adjacent elements. Such flow conditions are intended to be indicated in Fig. 6 of the drawings. Here, a plurality of spaced separator elements of the airfoil type, 150—156 are set with their major transverse axes parallel to the general direction of approaching fluid flow as indicated by the arrow 158. It will be noted that the fluid approaching the wide leading edges or faces of the separator elements 152 and 153 divides and flows around the leading portions of the elements with the flow generally parallel to those surfaces. Beyond these positions, the flow continues parallel to the sides of the elements with no substantial breaking away from those surfaces. However, when the major transverse axes of the elements of the row are positioned at an angle to direction of fluid stream approach or attack, a discontinuity of boundary layers along the one side of the elements develops, and eddy currents of the vortex type are set up. The extent to which this zone of discontinuity is projected laterally toward the remaining zone of laminar flow and axially in the general direction of fluid flow is a function of the angular positions of the downstream surfaces of the separator elements.

The eddy current zone so set up is of a pressure lower than that existing in the adjacent zone of laminar or streamline flow, and it has been found that such low pressure eddy current zones are effective in accumulating moisture particles of such a size that they may separate by gravity even against the upward flow of the approaching stream.

By relatively close spacing of the elements of each row and by inclining the major transverse axes of the elements of alternate rows in opposite directions, the fluid flow is divided into a plurality of streams as flow takes place between the elements of each row, and the eddy current zones are successively developed on opposite sides of the interelement laminar flow streams. The preferred spacing of the elements is of the order of that shown in the drawings wherein the minimum spacing between successive elements in the same transverse row is approximately equal to the maximum thickness of each element. The entire cross section of the fluid stream flow is thus caused to pass adjacent eddy current zones in which moisture particle agglomeration and separation is effected.

In a preferred embodiment of apparatus for carrying out the above described method of particle separation the elements are positioned with their major transverse axes at a preferred angle of 22½° to the approaching direction of the stream. The flow resistance through a row of these angularly arranged elements is related to the extent of eddy current zone formation, lesser angles allowing lower pressure drop but with a reduction in extent of the eddy current zone, while greater angles correspondingly increase the fluid pressure drop and the extent of the eddy current zones. Angles of 15° to 27° are considered to provide an effective utilization of the described separating action in eddy current zones.

With the airfoil elements arranged as shown, and at such an angle as 22½° (the angle A formed by the lines FF and XX in Fig. 5), eddy current or vortex zones will be set up on the downflow lateral surfaces of the airfoil elements while the stream flows past the opposite surfaces in a manner approaching laminar flow, such flow being indicated by the arrow 72 in Fig. 5. The eddy current zone along the shadowed side of each airfoil type section, and illustrated at 70' in Fig. 5, extends outward from that surface. This is a zone of lower pressure in which the particles carried by the fluid stream accumulate for separation. Some of these particles collect upon the surfaces of the separator elements and they accumulate until they flow down along these elements and drain therefrom at the bottom of the separator.

The separate elements 118—121 (Fig. 7) are set at such an angle to the general direction of approaching fluid flow, 117, that eddy current zones such as 121', 120', and 119' are set up adjacent the shadowed or downstream faces of the elements 119, 120, 121, respectively. These zones may extend beyond the trailing edges of these elements as indicated in the drawing. The separator elements 90—94 are reversely inclined with respect to the inclination of the first row of elements 118—122. With this arrangement, the separation zones effected by the separator elements of the second row, are disposed on their right hand sides as indicated at 90', 91' and 92'. Thus, if we consider a stream of fluid flowing between the adjacent separator elements 119 and 120 and then between 91 and 92, that stream, in collaboration with the element 120, first forms the eddy current separation zone 120' on its right hand side and then, passing between the separator elements 91 and 92 in the second row forms the eddy current zone 91' disposed on its opposite side. When this action is repeated several times, as when the fluid passes through a large number of rows of separator elements (as indicated in Fig. 3), the above indicated stream of fluid is subjected to recurrent separating effects alternating on opposite sides thereon. The total effect being the substantially complete separation of any entrained material of higher density in the stream.

Free drainage of the separated water from the lower ends of the separator elements is permitted by reason of the construction indicated in Figs. 3, 4, and 5. The lower ends of the elements are supported by spaced bottom members 80—88, the rows of separator elements being disposed above the spaces between the bottom members. In Fig. 5, for example, upright airfoil type elements 90—94 are mainly disposed above the free space between the bottom members 83 and 84 where the corresponding edges 100, 101, 102, and 103 of these members are welded to the bottom member 83 and their opposite edges 110—114 are welded to an edge of the bottom member 84. Similarly, the members 70, 120, 121, and 122 are welded to the edges of the bottom members 84 and 85, respectively.

Figure 2:
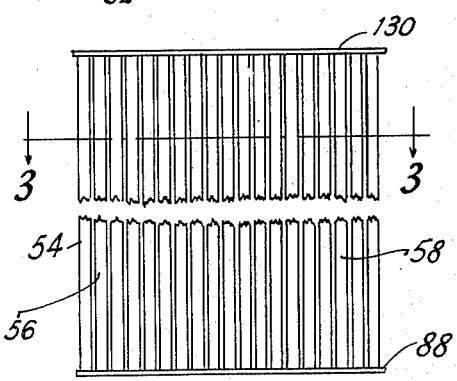
Fig. 2 is a vertical elevation of one of the separator components involving a plurality of upright separator elements of airfoil section type.

The tops of the separator elements are held in their operative spaced relationship by one or more members such as 130 shown in Fig. 2.

In this arrangement the trailing edge of a separator element in a leading row is spaced longitudinally of the general direction of fluid flow from the thicker leading edge of immediately following element in the succeeding row to permit the development of eddy current zones of maximum extent.

The airfoil type elements of the preferred construction indicated in Figs. 3 and 5 bear a 3 to 1 relationship of their transverse axes. The minor transverse axis, for example, is 1/8" and the major transverse axis is 3/8". The direction of such major transverse axis is indicated by the line X—X of Fig. 5 and the direction of the minor transverse axis is indicated by the line Z—Z. This line is normal to X—X, and disposed at the thickest portion of the element 70. The spacing of the elements in each row is preferably 1/8".

In the operation of the separator, water particles impacting against the thicker leading face of a separator element will separate, some of them passing along the side of the separator to its eddy current zone and the others passing in the laminar or stream flow along the opposite side of the element and thereafter passing to an eddy current zone of a following separator element of another transverse row.

What is claimed is:

1. In a fluid separator, groups of spaced and parallel airfoil type separator elements arranged in spaced rows disposed successively across a high velocity fluid stream, each such element being of tapered cross-section with a greater than 2–1 ratio of its major transverse dimension to its minor transverse dimension and with its thickest portion near its leading edge and combining therewith to present laminar flow curved surfaces confronting the oncoming fluid stream, means for supporting the elements with the direction of their major transverse dimensions at an angle within the 15° to 27° range to the general direction of flow of said fluid stream, the said angular disposition of said elements and said curvature of their leading edge portions causing the fluid stream to have substantially laminar flow divisions between successive elements and eddy current fluid separation zones of lower pressure along the downstream faces of the elements and laterally of said laminar flow divisions, said supporting means also holding the separator elements of any succeeding row angled as above but reversely to the separator elements of the immediately preceding row, and means providing for the removal of the heavier fluid particles which are formed in the eddy current zones and gravity separated therefrom.

2. In a gas and liquid separator, successive spaced rows of transversely spaced elements of airfoil type cross section extending across a high velocity fluid stream, said elements having their major transverse axes disposed at an angle of from 15° to 27° to the general direction of flow of the approaching fluid stream, at least the major portions of the downstream faces of each of said elements being disposed at an angle to said general direction of the approaching stream greater than the angle made by said major transverse axes with said general direction, this construction and arrangement setting up on the downflow sides of said elements eddy current zones of lower pressures in which the said particles are separated from the fluid, said airfoil elements in each row being of tapering section with their portions of maximum thickness near their edge portions confronting the oncoming fluid stream.

3. In a gas and liquid separator, successive spaced rows of transversely spaced elements of airfoil type cross section extending across a high velocity fluid stream, said elements having their major transverse axes disposed at an angle of from 15° to 27° to the general direction of flow of the approaching fluid stream with the elements of successive rows reversely oblique to said general direction of flow, at least the major portions of the downstream faces of each of said elements being disposed at an angle to said general direction of the approaching stream greater than the angle made by said major transverse axes with said general direction, this construction and arrangement setting up on the downflow sides of said elements eddy current zones of lower pressures in which the said particles are separated from the fluid, said airfoil elements in each row being of tapering section with their portions of maximum thickness near their edge portions confronting the oncoming fluid stream.

4. In a gas and liquid separator, successive spaced rows of transversely spaced elements of airfoil type cross section extending across a high velocity fluid stream, said elements having their major transverse axes disposed at an angle of from 15° to 27° to the general direction of flow of the approaching fluid stream, at least the major portions of the downstream faces of each of said elements being disposed at an angle to said general direction of the approaching stream greater than the angle made by said major transverse axes with said general direction, this construction and arrangement setting up on the downflow sides of said elements eddy current zones of lower pressures in which the said particles are separated from the fluid, said airfoil elements in each row being of tapering section with their portions of maximum thickness near their edge portions confronting the oncoming fluid stream, the ratio of the major transverse dimension of each separating element to its minor transverse dimension being greater than two to one.

5. In a gas and liquid separator, successive spaced rows of transversely spaced elements of airfoil type cross section extending across a high velocity fluid stream, the minimum transverse spacing of successive elements in each row being approximately equal to the maximum thickness of each element, said elements having their major transverse axes disposed at an angle of from 15° to 27° to the general direction of flow of the approaching fluid stream, at least the major portions of the downstream faces of each of said elements being disposed at an angle to said general direction of the approaching stream greater than the angle made by said major transverse axes with said general direction, this construction and arrangement setting up on the downflow sides of said elements eddy current zones of lower pressures in which the said particles are separated from the fluid, said airfoil elements in each row being of tapering section with their portions of maximum thickness near their edge portions confronting the oncoming fluid stream.

WILL H. ROWAND.

REFERENCES CITED

The following references are of record in the file of this patent:

UNITED STATES PATENTS

| Number | Name | Date |
|---|---|---|
| 1,156,511 | Wood | Oct. 12, 1915 |
| 1,789,931 | Hegan | Jan. 20, 1931 |
| 1,886,927 | Williams | Nov. 8, 1932 |
| 2,007,966 | Fletcher | July 16, 1935 |

FOREIGN PATENTS

| Number | Country | Date |
|---|---|---|
| 433,943 | Great Britain | Aug. 16, 1935 |